United States Patent Office 3,430,927
Patented Mar. 4, 1969

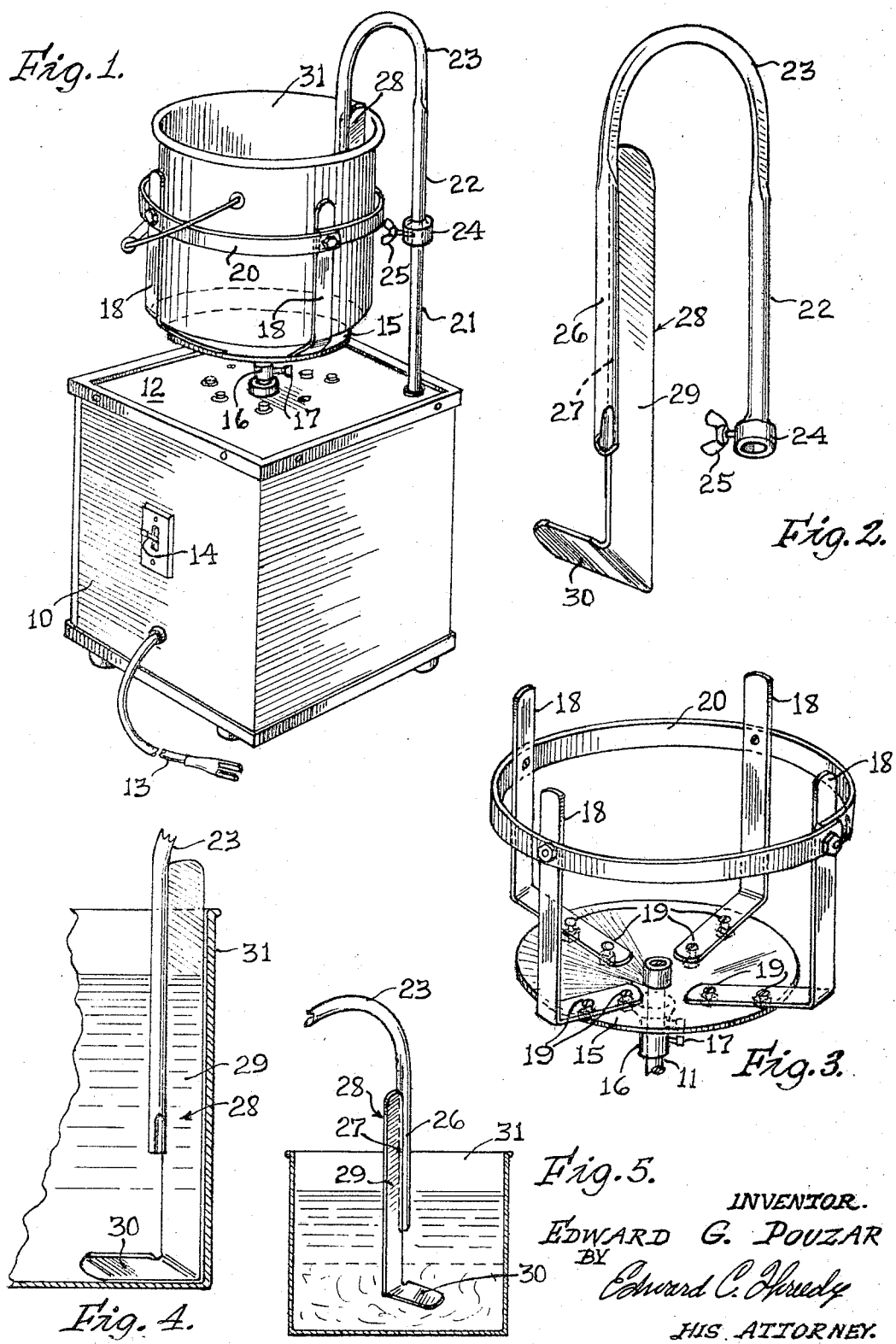

3,430,927
RECEPTACLE MOVING MIXER
Edward G. Pouzar, 5115 Dobson St.,
Skokie, Ill. 60076
Filed Nov. 6, 1967, Ser. No. 680,890
U.S. Cl. 259—88
Int. Cl. B01f 9/10
1 Claim

ABSTRACT OF THE DISCLOSURE

A mixer having a rotating support for a removable receptacle and a stirrer blade adjustable radially within the receptacle about its support and coaxially with respect to the center axis of the receptacle; a support for the blade cooperating with a locking member provided by the blade to adjustably position the same within the receptacle in relation to the material therein to be mixed.

Summary of the invention

Mixers of the type hereinafter described and claimed are classified in class 259, subclass 82, which pertains to moving receptacles employing a single stirrer or blade. The mixer of this invention provides a rotatable basket type support for a receptacle and a stirrer blade which is adjustable vertically and radially with respect to the receptacle. The feature of adjustability of the stirrer blade is desirable, in that the proper functioning of the blade depends upon the consistency and viscosity of the material to be mixed. It has been found that material having a heavy or thick consistency and high viscosity requires a different stirring action achieved from the position of the stirrer blade relative to the material to be mixed, and then, at a later stage in the mixing operation, when the consistency has been reduced and the viscosity lowered, another type of stirring action is required.

The invention consists in the novel combination and arrangement of parts to be hereinafter described and claimed. The invention will be best understood by reference to the accompanying drawings showing the form of construction, in which FIG. 1 is a perspective view of the mechanism with a receptacle positioned therein;

FIG. 2 is a perspective view of the adjustable stirrer blade of the invention;

FIG. 3 is a fragmentary perspective view of the basket type support for the receptacle;

FIG. 4 is a fragmentary side elevational view of the stirrer blade in one position within the receptacle; and FIG. 5 is a fragmentary side elevational view of the stirrer in another adjusted position within the receptacle.

The invention comprises a rectangular base container 10 which houses an electric motor and gear reducer (not shown) for rotatably driving a shaft 11 which extends vertically out of the top wall 12 of the base cabinet 10. An electric cord and plug 13 as well as a switch 14 comprise the electric control components for the mechanism.

The free end of the driven shaft 11 is connected to a receptacle supporting plate 15 by means of a circular collar 16 which is connected to the plate 15, as seen in FIG. 3. The collar 16 provides a wing nut 17 threaded inwardly from the side wall thereof into locking engagement with the free end of the shaft 11. The supporting plate 15 has connected thereto a plurality of L-shaped retaining arms 18. The base leg of each of the arms 18 may be connected to the plate 15 by means of screws 19, as shown. Embracing the free ends of the arms 18 is a circumferentially extending retaining band 20. The arrangement is such that a suitable receptacle such as a can, of liquid will be placed upon the supporting plate 15 within the arms 18 and embraced by the band 20, so that the receptacle will be rotated in one direction by the shaft 11.

Extending vertically from the top wall 12 of the base cabinet 10 is a fixed standard 21. The free end of the standard 21 is adapted to be projected into one arm 22 of a substantially U-shaped bracket 23. The free end of the arm 22 of the bracket 23 provides a connecting collar 24 which includes a wing nut 25 threadable therethrough into locking engagement with the free end of the standard 21. The opposite arm of the U-shaped bracket 23 is flattened as at 26 and has connected thereto by means of welding or the like one flat edge 27 of an L-shaped stirring blade 28. As viewed in FIG. 2, the stirring blade 28 provides an elongated paddle portion 29 which terminates into an angularly disposed base or scraper 30.

The arrangement is such that when the stirrer blade 23 is mounted on the standard 21, the paddle portion 29 as well as the scraper 30 will be positioned within the receptacle 31.

If the apparatus of this invention is used to mix ink, it has been found that during the storage of such liquid in the receptacle 31, it congeals, resulting in a separation of fluid and a thicker residue adhering to the walls of the receptacle. To function properly the stirrer blade 28 is adjusted vertically on the standard 21 radially thereabout, so that the paddel and scraper will be disposed in close proximity to the center line of the receptacle 31, with the scraper 30 raised with respect to the bottom wall of the receptacle, as shown in FIG. 5. As the contents of the receptacle 31 are progressively mixed, it requires that the stirrer blade 28 be radially adjusted so that the paddle 29 will scrape the side wall surface of the receptacle 31 as well as having the scraper 30 engage the bottom wall surface of the receptacle 31 so as to thoroughly mix any residue that may adhere to the wall surfaces thereof.

The adjustability of the stirrer blade 28 with respect to the standard 21 permits the same to be elevated out of the receptacle 31 so that the receptacle may be readily removed from the basket type support, as well as permitting the stirrer blade 28 to be completely removed from the apparatus to be cleaned and readied for successive operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

1. An apparatus for mixing ink having a high viscosity comprising:
 (a) a base cabinet housing an electric driving mechanism including a driving stud shaft extending vertically from the top wall of the cabinet,
 (b) an ink receptacle supporting plate having extending downwardly from the bottom surface thereof a collar adapted to embrace said stud shaft,
 (c) means carried by the collar for connecting the same to the stud shaft for rotation therewith,
 (d) a basket-like structure fixed to and carried by the plate for rotation therewith and into which an ink receptacle is removably mounted,
 (e) a fixed standard carried by the top wall of said cabinet and extending upwardly therefrom in parallel spaced relation with respect to said basket-like structure,
 (f) a substantially U-shaped bracket having one leg thereof telescopically positioned upon said standard for longitudinal and circumferential adjustment relative thereto, and having at its lower end a collar embracing said standard,
(g) the other leg of said bracket providing a flattened length,
(h) an L-shaped elongated paddle secured to said flattened length with its lower end portion terminating into an angularly extending scraper adapted to engage the inside surface of the bottom wall of the receptacle, and
(i) a wing nut carried by said collar and adapted to clamp the collar to said standard to retain the bracket with its paddle in any one of several positions relative to the axis of rotation of the receptacle and the inside wall of the latter depending upon the viscosity of the ink being mixed.

References Cited

UNITED STATES PATENTS

| | | | |
|---|---|---|---|
| 770,859 | 9/1904 | Hudson | 259—88 |
| 919,668 | 4/1909 | Williams | 259—88 |
| 2,944,799 | 7/1960 | Larson | 259—88 X |
| 3,173,352 | 3/1965 | Lane | 259—88 X |

ROBERT W. JENKINS, *Primary Examiner.*